(12) United States Patent
Potargent

(10) Patent No.: US 11,738,484 B2
(45) Date of Patent: Aug. 29, 2023

(54) SYSTEM AND METHOD FOR ROTATIONAL MOULDING

(71) Applicant: AMS Belgium, Bilzen (BE)

(72) Inventor: Johan Potargent, Bilzen (BE)

(73) Assignee: AMS Belgium, Bilzen (BE)

(*) Notice: Subject to any disclaimer, the term of this patent is extended or adjusted under 35 U.S.C. 154(b) by 100 days.

(21) Appl. No.: 17/607,444

(22) PCT Filed: Apr. 20, 2020

(86) PCT No.: PCT/IB2020/053721
§ 371 (c)(1),
(2) Date: Oct. 29, 2021

(87) PCT Pub. No.: WO2020/222072
PCT Pub. Date: Nov. 5, 2020

(65) Prior Publication Data
US 2022/0203579 A1    Jun. 30, 2022

(30) Foreign Application Priority Data

May 2, 2019  (BE) .................................. 2019/5292

(51) Int. Cl.
*B29C 41/46*      (2006.01)
*B29C 33/02*      (2006.01)
*B29C 41/04*      (2006.01)
*B29C 41/38*      (2006.01)

(52) U.S. Cl.
CPC .............. *B29C 41/46* (2013.01); *B29C 33/02* (2013.01); *B29C 41/042* (2013.01); *B29C 41/38* (2013.01)

(58) Field of Classification Search
CPC ................................................ B29C 41/04–06
See application file for complete search history.

(56) References Cited

U.S. PATENT DOCUMENTS

| 3,574,245 | A | 4/1971 | Dohm | |
|---|---|---|---|---|
| 6,555,037 | B1* | 4/2003 | Payne | E04C 2/205 264/328.8 |
| 9,327,431 | B2* | 5/2016 | Kuijt | B29C 41/38 |
| 2021/0187799 | A1* | 6/2021 | Moran | C08J 3/203 |
| 2021/0350051 | A1* | 11/2021 | Potargent | G06F 16/29 |
| 2021/0354341 | A1* | 11/2021 | Potargent | G05B 17/02 |

FOREIGN PATENT DOCUMENTS

| BE | 1027595 B1 * | 4/2021 | ............. B22F 10/00 |
|---|---|---|---|
| EP | 1649997 A1 | 4/2006 | |
| GB | 1101519 A * | 1/1968 | ............. B29C 33/04 |
| WO | 2013164765 A2 | 11/2013 | |
| WO | WO-2018069459 A1 * | 4/2018 | ......... B29C 33/0011 |

* cited by examiner

*Primary Examiner* — Atul P. Khare
(74) *Attorney, Agent, or Firm* — N.V. Nederlandsch Octrooibureau

(57) ABSTRACT

The present invention is a system for producing an object from a material that contains a hardenable base material using rotational moulding, wherein the system is comprised of a robotic arm and a die that can be attached to the robotic arm. The die contains a die cavity defined by a die wall, wherein the die is configured for receiving the material in the die cavity. The current invention also involves a method for production of an object of a material containing a hardenable base material using rotational moulding.

24 Claims, 3 Drawing Sheets

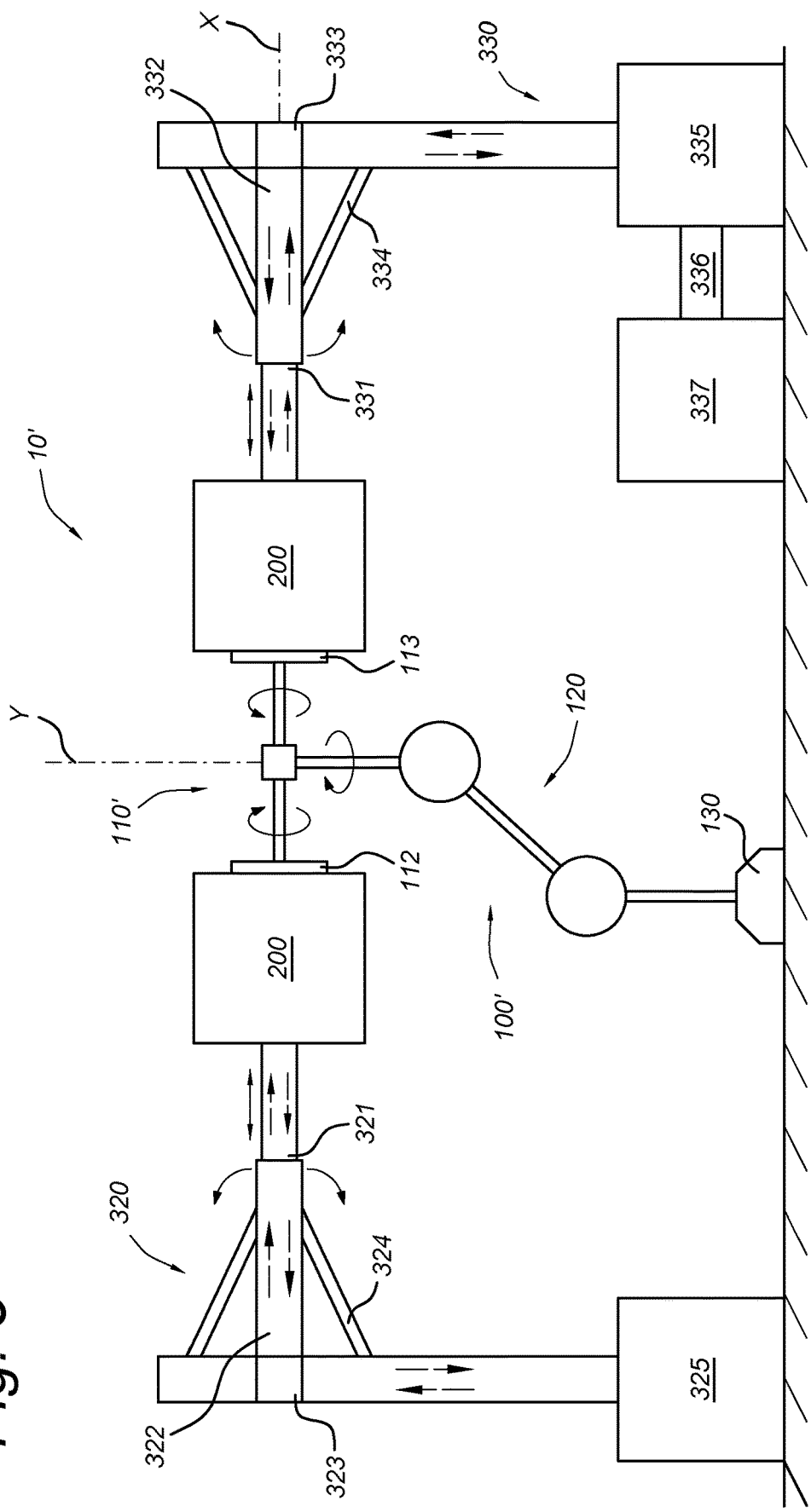

SYSTEM AND METHOD FOR ROTATIONAL MOULDING

Figure 1:
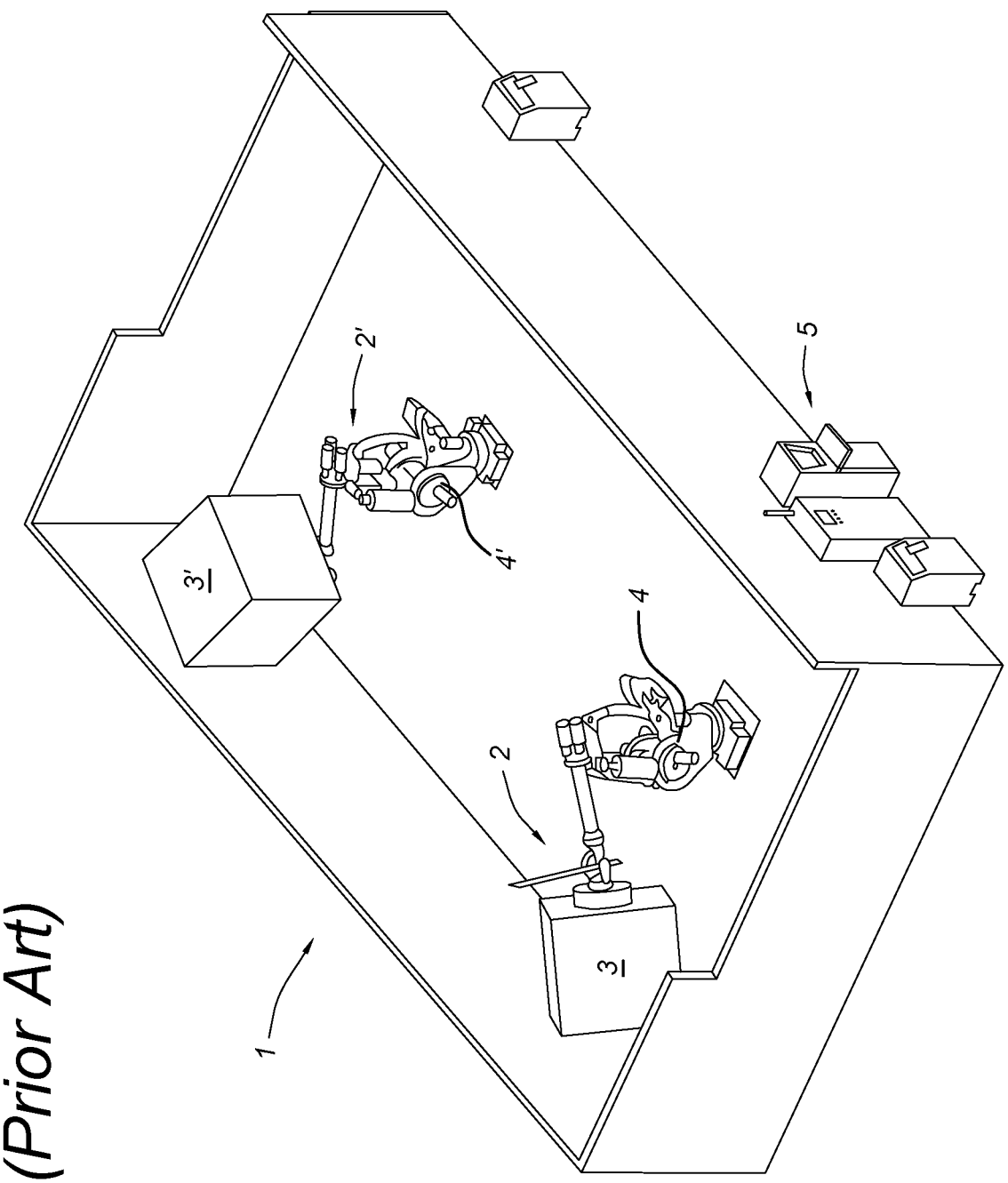

The present invention relates to a system for producing an object from a material that contains a hardenable base material using rotational moulding, wherein the system is comprised of a robotic arm and a die that can be attached to the robotic arm. The die contains a die cavity defined by a die wall, wherein the die is configured for receiving the material in the die cavity. The current invention also involves a method for production of an object of a material containing a hardenable base material using rotational moulding.

STATE OF THE ART OF TECHNOLOGY

A similar system is known from BE 1020382 A5. Known technologies for rotational moulding fill a die with a quantity of material, after which the die is placed in a kiln for heating and smelting of the material. As soon as the plastic has melted, the die is rotated and possibly agitated to achieve the desired distribution of the melted material in the die. After that, the die is cooled and the moulded object is removed from the die.

In known systems, the die is cooled using ventilation or by using a coolant. For example, EP 1.649997 A1 published a die for rotational moulding in which a liquid channel for heated and cold liquids is integrated directly into the die wall.

OBJECTIVE OF THE INVENTION

One objective of the invention may be to create a system of the type named above that does not display at least one of the disadvantages of the state of the art of technology. An additional objective of the invention may be to create a system of the type listed above that can shorten production time, in particular the time to heat and/or cool the material.

DESCRIPTION OF THE INVENTION

This objective is achieved, according to the invention, with a system that displays the technical characteristics of the first independent claim.

In a first aspect of the invention, which may occur in combination with the other aspects and designs of the invention described here, the invention includes a system for producing an object from a material that contains a hardenable base material using rotational moulding, i.e. The tension-free heating material, for example, a thermoplastic, in a die into a product formed by rotation. The system includes an assembly of a die and rotation assemblies for moving the die, wherein the die is in a heat exchange relationship with, and is preferably equipped with a flow channel for the heating or cooling of the die with a first connection for the addition of a heat exchange medium or heat exchange fluid, preferably a heat exchange fluid, on one end of the flow channel, an on the other end of this flow channel there is a second connection for draining of the heat exchange fluid. The system also includes a thermal assembly for the flow of the heat exchange fluid through the flow channel. The thermal assembly includes a heat exchange fluid store and a connector for connecting the thermal assembly to at least one of the connections on the flow channel. The connector is attached at one end to the heat exchange fluid store and the free end has a connector for attaching the connector to at least one of the connections on the flow channel.

Through the presence of the thermal assembly, it is possible to provide a greater throughput of fluid with regard to the flow channels provided in the rotation assemblies, such as a robot or a robotic arm, where the available internal space is limited by the presence of electrical elements, such as electrical wiring and insulation elements to protect the electrical elements. Furthermore, according to the invention, it is also possible to add a thermal assembly to an existing system without additional changes being required to the rotation assemblies.

The thermal assembly may also contain positioning equipment for positioning the connector assemblies with regard to at least one connection. The positioning equipment may be laid out to move the connectors to the fixed end or to rotate the connector and connection assemblies around a rotation point R near the fixed end of the connector.

Through the presence of the positioning equipment, it is possible to line up the connection assemblies and the at least one connection accurately so that the connection can be made efficiently.

In a first design according to the invention, the connection assemblies and at least one connection form a swivel joint. The swivel joint can be designed, for example, as a rotating joint, in particular with rotoglyde connection assemblies, or a ball joint, preferably a flexible ball joint, wherein the connection assemblies contain the ball of the ball joint and at least one connection has a complementary recipient to receive the ball.

In a second design according to the invention, the connector is floating, preferably at the height h with regard to the foot of the rotation assemblies.

In a third design according to the invention, the thermal assembly contains a thermal source and a heat exchanger using which the thermal source, such as a heat source or a cooling source, and the heat exchange fluid store are arranged in a heat exchanging relationship with each other. With this it is possible to use separate circuits to use the heat exchange fluid as a coolant or heating agent depending on the thermal source connected, in particular depending on the temperature of the heat exchange medium created by the thermal source with regard to the temperature of the material or the moulded object.

In designs according to the invention, the system can contain multiple dies connected in a mobile manner to the rotation assemblies and/or multiple thermal assemblies.

In a second aspect of the invention, which may arise in combination with the other aspects and designs of the invention described here, the invention contains a thermal assembly controlling the flow of a heat exchange medium through a flow channel for heating or cooling a die as defined above.

In a third aspect of the invention, which may arise in combination with the other aspects and designs of the invention described here, the invention includes a method for controlling the flow of a heat exchange fluid through a flow channel of a die for the heating or cooling of the die in the system described for it, including the positioning of the connection assemblies with regard to at least one connection, for example the movement of the connection assemblies toward the fixed end of the connector and/or rotation of the connector around a rotation point R near the fixed end of the connector.

In designs according to the invention, the method includes the alignment of the connector using rotation with the at least one connection, the telescopic extension of the connector and connection of the connection assemblies to the free end of the connector with at least one connection.

SUMMARY DESCRIPTION OF THE FIGURES

The invention will be explained in more detail using a design shown in the figure.

Figure 2:
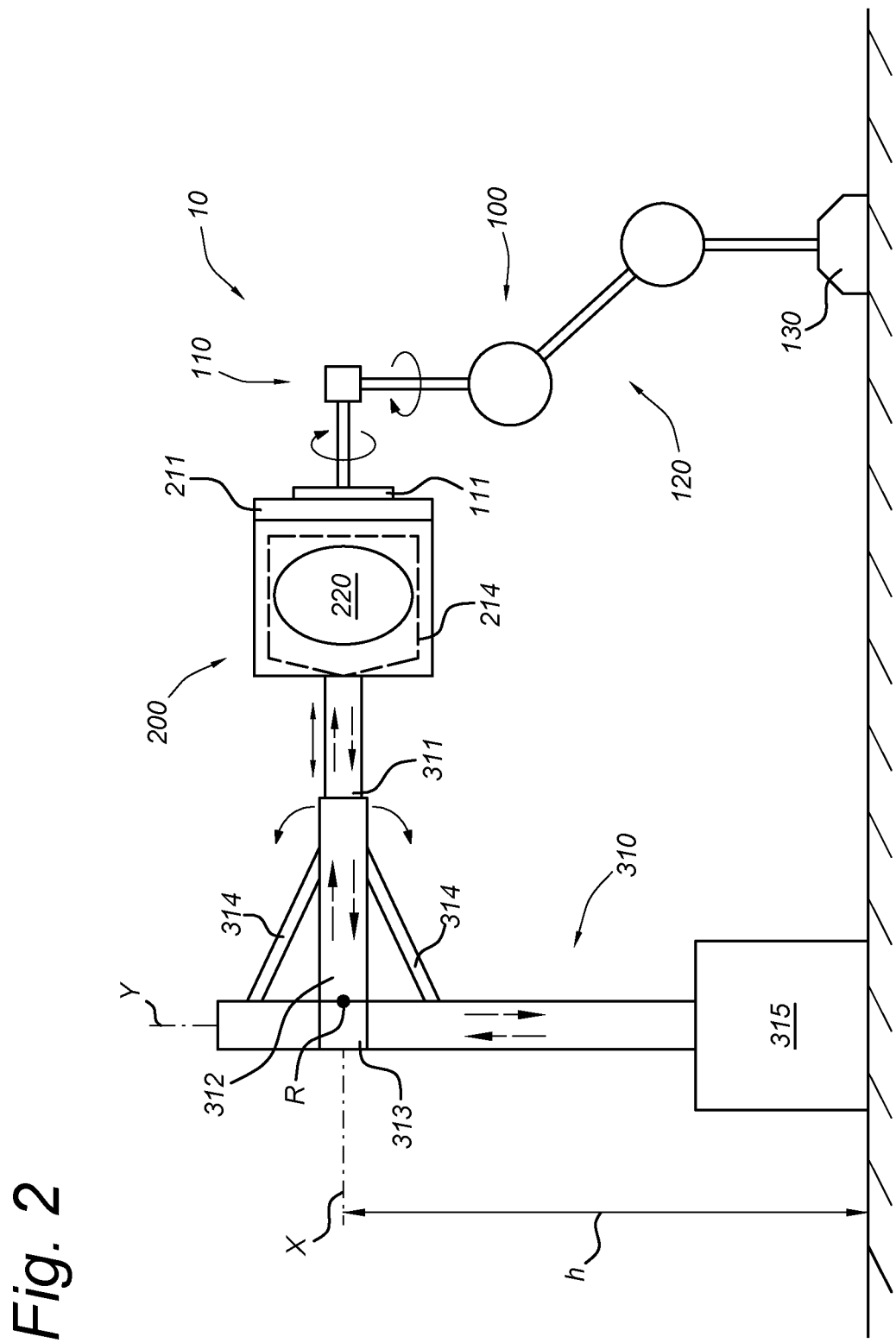

FIG. 1 shows a simplified presentation in perspective of a system according to the state of the art of technology; and FIGS. 2 and 3 show schematic cross sections of a system according to a first and second design of the current invention.

DETAILED DESCRIPTION OF THE FIGURES

The current invention will be described with regard to particular designs and with reference to certain figures, but the invention is not limited to these and is only determined by the claims. The figures described are only schematic and non-limiting. In the figures, the size of certain element is exaggerated an not drawn to scale for illustrative purposes. The dimensions and the relative dimensions are not necessarily consistent with actual practical designs of the invention.

In addition, the terms first, second, third and the like are used in the description an claims to differentiate between similar elements and not necessarily to describe a sequential or chronological sequence. The terms are interchangeable under fitting circumstances and the designs of the invention can be applied in sequences other than those described or illustrated here.

In addition, the terms, top, bottom, over, under an the like in the description and claims are used for illustrative purposes and not necessarily to describe relative positions. The terms used are interchangeable under fitting circumstances and the designs of the invention described can be applied in other orientations than described or illustrated here.

Furthermore, the various designs, even though called "preferred designs" must be considered rather as a manner of example of how the invention can be designed than as a limitation of the range of the invention.

The term "comprising", used in the claims, must not be interpreted as being limited to the resources or steps listed after it. The term does not exclude other elements or steps. The term should be interpreted as specifying for the presence of the listed features, elements, steps or components which are referenced, but does not exclude the presence or addition of one or more other features, elements, steps or components or groups thereof. The range of the expression "a design comprising resources A and B" must thus not be limited to designs that consist only of A and B. The intention is that, with regard to the current invention, only the components A and B of the design are summarized, and the claim must be further interpreted as they also contain equivalents of these components.

The systems shown in the figures are rotational moulding systems or elements for these, to produce an item made of a material containing a hardenable base material using rotational moulding.

In the text below, a material referred to as containing a hardenable base material is plastic. However, it must be clear that a hardenable base material can be thermoplastics, thermoset resins, metal, chocolate, fat or any other material that can be moulded or attached using rotational moulding. In particular, composite or fibre reinforced plastic materials or materials consisting of combinations of thermoset materials and fibre materials, such as "short", "long" or "prepreg" carbon fibres.

FIG. 1 shows a known system for rotational moulding. The system 1 shown contains multiple assemblies 2, 2' for rotational moulding and a central control unit 5 for the controlling of the assemblies 2, 2'. Each assembly 2, 2' includes a die 3, 3' and a robot or robotic arm 4, 4' to receive the die 2, 2' on a free end.

The functionality of such a system includes in the first step the filling of the die cavity in the die with a pre-weighed quantity of base material, such as in powder form, after which the die is closed. In a subsequent second step, the die filled with base material is heated to a desired temperature, such as a pre-determined melting temperature of the base material. While heating the die, the die is rotated around its vertical and/or horizontal axis so that the melting base material is brought into contact with the internal walls of the die surrounding the die cavity. The die continues to rotate until all of the base material in it is melted and evenly structured and distributed. In a subsequent third step, the die is cooled with air, water or a combination of the two. In this way, the die and the melted layer of base material are cooled, after which the die is opened and the moulded product removed. After this, the die can be filled again and the process started from the beginning.

FIGS. 2 and 3 display systems 10, 10' for producing a plastic object using rotational moulding according to the designs of the invention. The systems displayed 10, 10' include a robot 100 and a die 200 equipped with a flow channel 214 with an input connection on one end of the flow channel and a drain connection on the other end of the flow channel. The system 10, 10' also include at least one thermal assembly 310, 320, 330 for input and drainage of a heat exchanging fluid, such as a coolant, on the connections of a flow channel in or around the die wall of the die 200.

The robot 100 shown includes a robotic arm 110 and a robotic foot 130 connected using a robot body 120. The robotic arm 110 is equipped for connection to at least one die 200.

The die 200 shown includes a defined cavity 220 through a die wall 210 and the flow channel 214. The die 200 is connected to the robotic arm 110 using coupling elements 111, 211. In the design shown, the coupling elements are designed as complementary coupling elements, with a first coupling elements 111 on the robotic arm 110 and a second coupling element 211 on the die 111.

Additional possible designs of the die 200 according to the invention are described in WO 2018; 69459:A1, which is wholly included here as a reference.

The thermal assembly 310 shown in FIG. 2 includes a telescopic connector 311, 312 for input of a heat exchange liquid to the input connection of the flow channel 214 ad for draining a heat exchange liquid from the drain connection of the flow channel, and a booster 313 for promoting the flow of the heat exchange liquid through the connector 311, 312 and the flow channel 214. On the free end 318 of the connector 311, 312, there are coupling elements for connecting the connector 311, 312 to the input and drain connections of the flow channel 214.

The thermal assembly 310 shown here also has positioning elements 314, for example, actuators or (hydraulic) cylinders for positioning the connector on the die 200. The positioning elements 314 can be arranged to turn around the connector toward a rotation point R. In particular, it is possible to turn the connector 311, 312 over an angle of 25° on the XZ plane vertically on the Y axis and over an angle of 50° in the XY plane. The thermal assembly 310 shown also has a heat exchange liquid store 315 in fluid connection with the booster 313, the connector 311, 312 and the coupling elements.

The functionality of such an assembly includes in a first step the pulling out or extending the telescopic part 311 of the connector when the input and drain connections of the die 200 are within range. In a second step, the coupling elements are attached to the free end 318 of the connector 311, 312 with the connections, such as using a flexible ball coupling in which the free end 318 is equipped with the ball and the connection of a complementary recipient for receiving the ball.

The system 10' shown in FIG. 3 according to a second design of the invention includes multiple thermal assemblies according to the invention in the form of a heating element 320 provided in a first position for the heating of the die 200 and a cooling system 330 in a second position for cooling the die 200. In particular, the first and second positions are on opposite sides to the robot 100' as shown in FIG. 3. The robot 100' is equipped with a robotic arm 110' with multiple coupling elements 111 and connected with these to the 200 to form an object from a hardenable base material.

The thermal assemblies 310, 320, 330 shown can also include a cooling or heat source 337 for the direct or indirect cooling or heating off the heat exchange liquid using a heat exchanger 336.

In designs not shown, the system 10, 10' may also include an input assembly to input the first material that contains a first plastic into the die cavity 200 of one or more dies 200 for moulding an object. The assembly may include two or more base material inputs, wherein a first input assembly is provided for the supply of the first die with a first base material and a second input assembly is provided for the supply of a second die with a second base material.

LIST WITH REFERENCE NUMBERS

10. System for rotational moulding
100, 100'. Robot
110, 110'. Robotic arm
120. Robot body
130. Robot foot
200. Die
310, 320, 330. Thermal assembly
311, 321, 331. Telescopic part of the connector
312, 322, 332. Fixed part of the connector
313, 323, 333. Booster
314, 324, 334. Positioning elements
315, 325, 335. Heat exchange fluid store
336. Heat exchanger
337. Thermal source
318, 328. Free end of the connector

The invention claimed is:

1. A system for the production of an object of a material containing a hardenable base material using rotational moulding, the system comprising:
an assembly of a die and rotation elements for movement of the die, wherein the die is in a heat exchanging relationship with a flow channel for heating or cooling the material or object located within the die, the flow channel having a first connection for supplying a heat exchange fluid at one end of the flow channel and having a second connection for draining off the heat exchange fluid at another end of the flow channel, and
a thermal assembly for promoting flow of the heat exchange fluid through the flow channel, the thermal assembly comprising:
a heat exchange fluid store for storing the heat exchange fluid; and
a telescopic connector for connecting the thermal assembly to at least one of the first and second connections of the flow channel, wherein a fixed end of the connector is connected to the heat exchange fluid store and a free end of the connector is equipped with coupling elements for connecting the connector to at least one of the first and second connections of the flow channel,
wherein the rotation elements comprise a robotic arm connected to the die by means of coupling elements of the rotation elements.

2. A system according to claim 1, wherein the thermal assembly further comprises positioning elements for positioning the coupling elements of the connector toward at least one of the first and second connections.

3. A system according to claim 2, wherein the positioning elements are arranged to move the coupling elements of the connector toward the fixed end.

4. A system according to claim 3, wherein the connector has a fixed part and a telescopic part that can be slid in and out of the fixed part, and wherein the telescopic part comprises the free end of the connector and the associated coupling elements of the connector.

5. A system according to claim 2, wherein the positioning elements are arranged to rotate the connector around a rotation point R located near the fixed end of the connector.

6. A system according to claim 5, wherein the positioning elements are arranged to rotate the connector at a maximum over an angle of 25-50° toward a central axis (X) of the connector.

7. A system according to claim 1, wherein the coupling elements of the connector and the at least one of the first and second connections form a swivel joint.

8. A system according to claim 7, wherein the swivel joint is designed as a ball joint, wherein the coupling elements of the connector contain the ball of the ball joint, and wherein the at least one of the first and second connections has a complimentary ball recipient of the ball joint.

9. A system according to claim 1, wherein the connector is floating with respect to a foot of the rotation assembly.

10. A system according to claim 1, wherein the thermal assembly contains a thermal source and contains a heat exchanger to which the thermal source and the heat exchange fluid store are in a heat exchanging relationship.

11. A system according to claim 1, wherein the coupling elements of the rotation elements are arranged at an opposite side of the die with respect to the first and second connections.

12. A system according to claim 1, wherein the thermal assembly is a first of two thermal assemblies defined according to claim 1, wherein the first of the two thermal assemblies is arranged for promoting flow of a heating fluid through the flow channel for the heating of the die, and wherein a second of the two thermal assemblies is arranged for promotion of flow of a coolant through the flow channel for cooling the die.

13. A system according to claim 12, wherein the first thermal assembly and the second thermal assembly are located on opposite sides of the rotation elements.

14. A system according to claim 1, wherein the die is one of multiple dies movably attached with the rotation elements.

15. A thermal assembly for promoting flow of a heat exchange fluid through a flow channel for heating or cooling of a die, the thermal assembly forming part of a system defined according to claim 1.

16. A method for the production of an object of a material that contains a hardenable base material by rotation moulding using the system according to claim 1, the method comprising the steps of:
- filling a die cavity in the die with the material;
- heating the material to a first pre-determined temperature by promotion of the flow of a heating fluid through the flow channel;
- rotating the die by the rotation elements in such a way that the object is moulded from the material; and
- cooling the material to a second pre-determined temperature by promotion of the flow of a coolant through the flow channel.

17. A method according to claim 16, comprising, prior to the step of filling the die cavity, preheating the die to a third pre-determined temperature lower than the first pre-determined temperature.

18. A method according to claim 16, wherein the die is not connected to the rotation elements during the preheating step.

19. A method according to claim 16, wherein the die is not connected to the rotation elements during the preheating step and/or during the cooling step.

20. A method for promoting the flow of a heat exchange fluid through a flow channel which is in a heat exchange relationship with the die of a system according to claim 1, the method comprising connecting the coupling elements of the connector of the thermal assembly of the system to at least one of the first and second connections of the flow channel.

21. A method according to claim 20, comprising the prior positioning the coupling elements of the connector toward at least one of the first and second connections of the flow channel prior to said connection of the coupling elements of the connector to at least one of the first and second connections.

22. A method according to claim 21, comprising moving the coupling elements of the connector toward the fixed end of the connector for said positioning.

23. A method according to claim 20, comprising rotating the connector of the thermal assembly around a rotation point R located near the fixed end of the connector.

24. A method according to claim 20, comprising:
- rotationally aligning the connector with at least one of the first and second connections;
- telescopically extending the connector toward the die; and
- connecting the coupling elements of the connector, at the free end of the connector to at least one of the first and second connections.

* * * * *